(12) United States Patent
Troutman

(10) Patent No.: US 7,743,549 B2
(45) Date of Patent: Jun. 29, 2010

(54) JIG FISHING LURE

(76) Inventor: Conrad Mark Troutman, 1724 Bragdon La., Knoxville, TN (US) 37919

( * ) Notice: Subject to any disclaimer, the term of this patent is extended or adjusted under 35 U.S.C. 154(b) by 0 days.

(21) Appl. No.: 11/890,876

(22) Filed: Aug. 7, 2007

(65) Prior Publication Data

US 2007/0271837 A1  Nov. 29, 2007

Related U.S. Application Data

(63) Continuation of application No. 11/076,578, filed on Mar. 9, 2005, now abandoned.

(51) Int. Cl.
  *A01K 85/12* (2006.01)
(52) U.S. Cl. .................. 43/42.19; 43/42.39; 43/42.47
(58) Field of Classification Search .............. 43/42.19, 43/42.2, 42.37, 42.38, 42.39, 42.45, 42.46, 43/42.47
  See application file for complete search history.

(56) References Cited

U.S. PATENT DOCUMENTS

| | | | | |
|---|---|---|---|---|
| 2,989,817 A * | 6/1961 | Kepler | ........................ | 43/42.39 |
| 3,680,247 A * | 8/1972 | McKenzie | ................. | 43/42.17 |
| 3,890,736 A * | 6/1975 | Worden | ..................... | 43/42.11 |
| 4,090,319 A * | 5/1978 | Wolfe | ......................... | 43/42.19 |
| 4,860,486 A * | 8/1989 | Vanderplow | ............... | 43/42.19 |
| 5,136,801 A * | 8/1992 | Pond | ......................... | 43/42.39 |
| 5,201,859 A * | 4/1993 | Rosek | ....................... | 43/42.19 |
| 5,327,671 A * | 7/1994 | Rosek | ....................... | 43/42.17 |
| 5,412,900 A * | 5/1995 | Rosek | ....................... | 43/42.19 |
| 5,491,927 A * | 2/1996 | Ortiz | ........................ | 43/42.28 |
| 6,405,477 B1* | 6/2002 | Huppert | ..................... | 43/44.8 |
| 6,665,977 B2* | 12/2003 | Hammond | ................. | 43/42.18 |
| 6,748,692 B2* | 6/2004 | Sprouse | .................... | 43/42.13 |

FOREIGN PATENT DOCUMENTS

DE  10015572  * 10/2001

* cited by examiner

*Primary Examiner*—David J Parsley
(74) *Attorney, Agent, or Firm*—Luedeka, Neely & Graham, P.C.

(57) ABSTRACT

A jig-type fishing lure having a jig body with a hook extending from a rear portion of the body and a spinner-type fish attractant located forward of a front end of the jig body. A fishing line is attached to an attachment point located between the spinner-type fish attractant and the barb of the rearwardly extending hook.

11 Claims, 2 Drawing Sheets

JIG FISHING LURE

RELATED APPLICATIONS

This application is a continuation of U.S. patent application Ser. No. 11/076,578, filed Mar. 9, 2005 now abandoned.

FIELD OF THE INVENTION

This invention relates generally to fishing lures. More particularly, this invention relates to a jig fishing lure which incorporates a movable member at a location forward the location on the jig where a fishing line is attached.

BACKGROUND AND SUMMARY OF THE INVENTION

Jigs are a popular type of fishing lure and are used to fish for a variety of fish species. Jigs are typically characterized as having a hook partially embedded within a jig body, typically a weighted body of lead. Prior jigs are known which incorporate spinners or propellers to add desirable fish-attracting effects. The present invention relates to a jig lure incorporating a movable member, such as a propeller or a spinner, in a manner which is believed to enhance fish attracting characteristics, particularly when the jig lure is vertically jigged.

In a preferred embodiment, the lure includes a hook having a bend adjacent a barb to define a rear end of the lure and a shank extending toward an opposite front end of the lure. A lure body is attached to a portion of the shank of the hook and a movable support member extends from the lure body toward the front end of the lure and generally away from the rear end of the lure. A movable member, such as a spinner blade or a propeller, is movably associated with the movable support member for moving during use of the lure to attract fish to the lure. The movable member is located forward of the lure body adjacent the front end of the lure. A line attachment member is located adjacent the body for securement of a fishing line to the lure. The line attachment member is located between the rear end of the lure and the movable member. In a preferred embodiment, the line attachment member is provided by an eye of the hook that extends from the lure body.

In another embodiment, the invention relates to a jig-type fishing lure having a jig body with a hook extending from a rear portion of the body and a spinner-type fish attractant located forward of a front end of the jig body. A fishing line is attached to an attachment point located between the spinner-type fish attractant and the barb of the rearwardly extending hook.

BRIEF DESCRIPTION OF THE DRAWINGS

Further features of preferred embodiments of the invention will become apparent by reference to the detailed description of preferred embodiments when considered in conjunction with the figures, which are not to scale, wherein like reference numbers, indicate like elements through the several views, and wherein.

DETAILED DESCRIPTION

Figure 1:
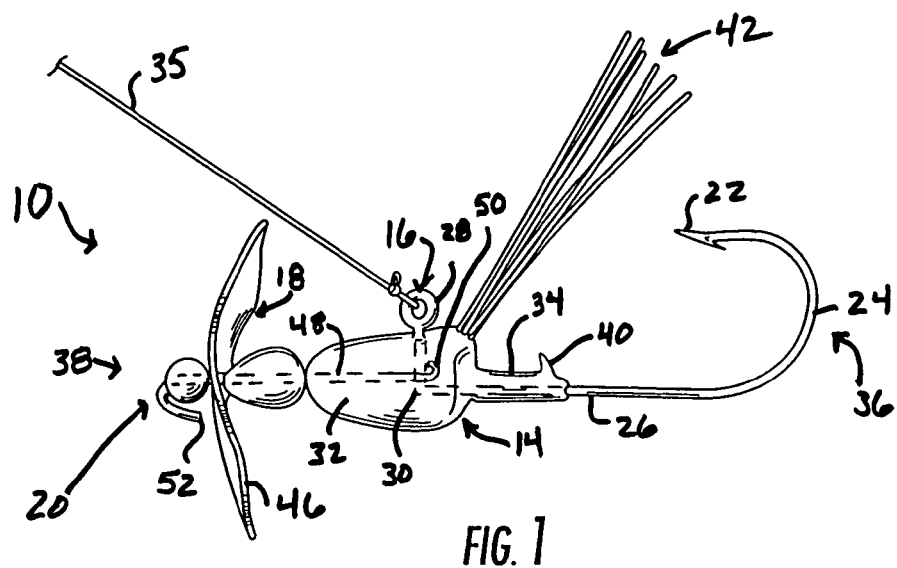
FIG. 1 is a side view of a jig lure in accordance with a preferred embodiment of the invention incorporating a propeller type movable member and illustrating attachment of a fishing line to the jig and the orientation of the fishing line such as when the jig lure is being raised upwardly during vertical jigging.

With initial reference to FIG. 1, the invention relates to a fishing lure 10 having a hook 12, a body 14, a line attachment member 16, a movable member 18, and a movable member support 20.

The hook 12 includes a barb 22, a bend 24, a shank 26, and an eye 28. The hook 12 is preferably a conventional hook of the type used to make jigs, such as a 1/0 Aberdeen style jig hook. The depicted hook 12 is a conventional jig hook and has a bend 30 in the shank adjacent the eye 28. The bend 30 is preferably made at an angle of from about 60 to about 90 degrees relative to the shank 26.

The body 14 is preferably a weighted body, most preferably formed of lead, tungsten, or the like, and formed by placing the hook in a mold to shape the lead to form the body 14 in a desired shape surrounding a portion of the hook 12. For example, the body 14 is preferably shaped to include a head 32 and a collar 34, with a portion of the shank 26 within the body 14 so that the eye 28 of the hook 12 extends free of the head 32 and the barb 22 of the hook 12 is posterior of the collar 34. Accordingly, when a jig hook is used, the line attachment member 16 is preferably provided by the eye 28 of the hook 12. However, in the event a straight-shanked hook is used or the body is formed such that the eye of the hook is not exposed, then the line attachment member 16 may preferably be provided as by a screw eye or other structure which provides structure to attach a fishing line 35.

The jig lure 10 has a rear end 36 generally corresponding to the bend 24 and a front end 38 generally corresponding to the portion of the movable member support 20 most remote from the bend 24. After the body 14 is formed, it is preferably colored as by painting or powder coating. The body 14 may be formed in a variety of shapes. Examples of preferred body shapes are common jig body shapes such as round, tube, pony, banana, shad, and football. The collar 34 preferably includes a barb 40 to help hold a plastic bait or the like.

Figure 2:
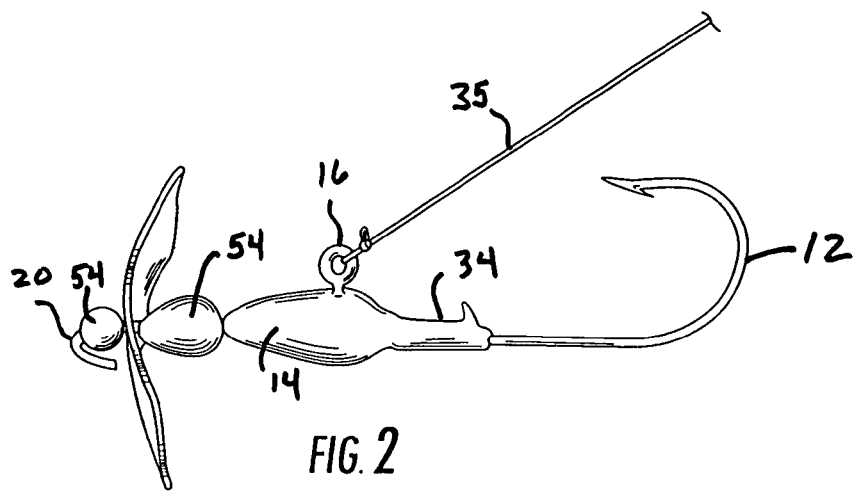
FIG. 2 is a side view of a jig lure in accordance with an alternate embodiment of the invention and illustrating attachment of a fishing line to the jig and the orientation of the fishing line such as when the jig lure is allowed to fall during vertical jigging.
Figure 3:
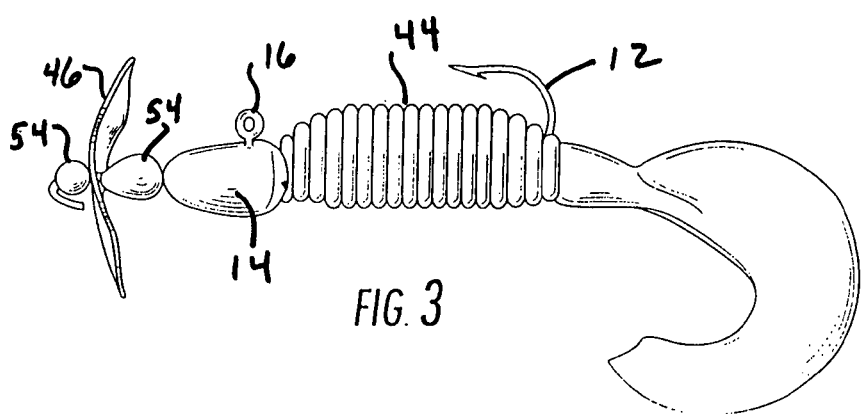
FIG. 3 is a side view of a jig lure in accordance with yet another embodiment of the invention and showing a plastic bait incorporated on the jig lure.

The body 14 may also preferably include structure for inhibiting snagging of the hook 12, such as when the jig lure 10 is fished in water having weeds. For example, a weed guard 42 may be included as by positioning stiff fibers or the like within the mold during formation of the body 14. Likewise, a rubber skirt, bucktail, feathers, and the like may be incorporated into the head or an attractant, such as a plastic bait may be installed. In this regard, FIGS. 2 and 3 show alternate head shapes, with FIG. 3 showing a plastic grub 44 positioned on the hood 22.

The movable member 18 is preferably configured to move when the jig lure 10 is moved underwater. For example, when the lure 10 is pulled upwardly through the water or allowed to fall or settle toward the bottom of a body of water. Examples of preferred structures for the movable member 18 include a propeller 46. When the lure 10 is moved through the water, the propeller will spin or rotate about the movable member support 20 and emit flash from reflected sunlight and vibrations which are believed to attract fish to the lure 10.

The movable member support 20 is preferably provided by a portion of wire 48 having opposite ends 50 and 52. For example, the support 20 may be 19 gauge steel wire. The end 50 is preferably provided within the mold during formation of the body 14 and bent around the shank 26 of the hook 12 adjacent the bend 30 (FIG. 1). The wire 48 is preferably substantially straight or linear along its length and sized and located so as to extend substantially co-axial with the major straight portion of the shank 26 of the hook 12.

The wire 48 preferably extends out of a frontal portion of the body 14 a distance sufficient to enable mounting of the movable member 18, such as the propeller 46, thereto. The end 52 is preferably curled to serve as a stop to retain the propeller 46 from sliding off the wire 18. In addition, additional attractants, such as one or more preferably brightly colored beads 54, are preferably located on the movable member support 20. The beads 54 preferably range in size from about 2 to about 6 mm in major diameter and two of the beads 54 are preferably installed, one on each side of the propeller 46. It has been observed that this orientation of the beads 54 facilitates rotation of the propeller 18. The beads 54 may be of a variety of shapes, such as round and teardrop shapes.

Figure 4:
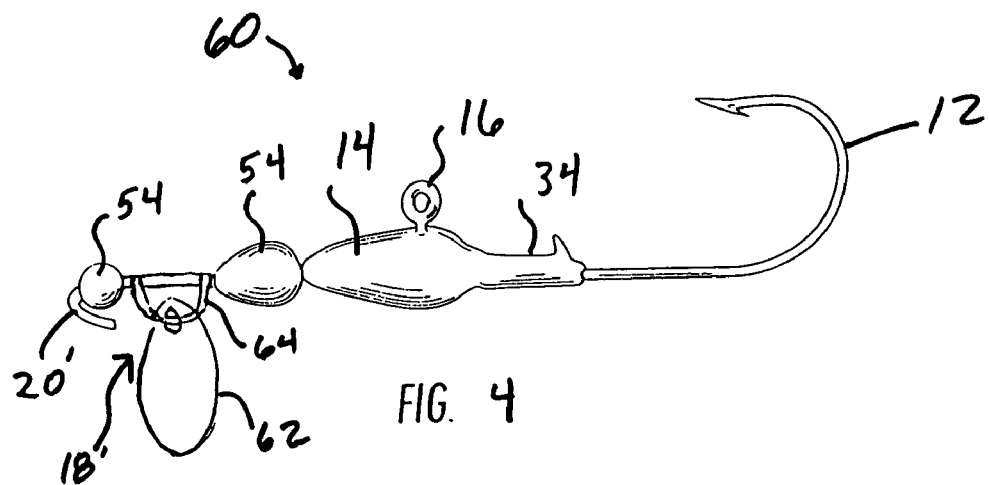
FIG. 4 is a side view of a jig lure in accordance with a still further embodiment of the invention incorporating a spinner type movable member.

With reference to FIG. 4, there is shown a jig lure 60 in accordance with an alternate embodiment of the invention. The lure 60 is substantially similar to the previously described lures, except it incorporates a slightly more elongate support 20' and incorporates a movable member 18' in the form of a spinner blade 62 mounted to the support 20' as by a preferably metal clevis 64 rotatably mounted on the support 20'. The blade 62 is preferably shaped to correspond to conventional fishing blades, such as blade shapes referred to as Colorado, Indiana, Willowleaf, and Dakota blades.

Figure 5:
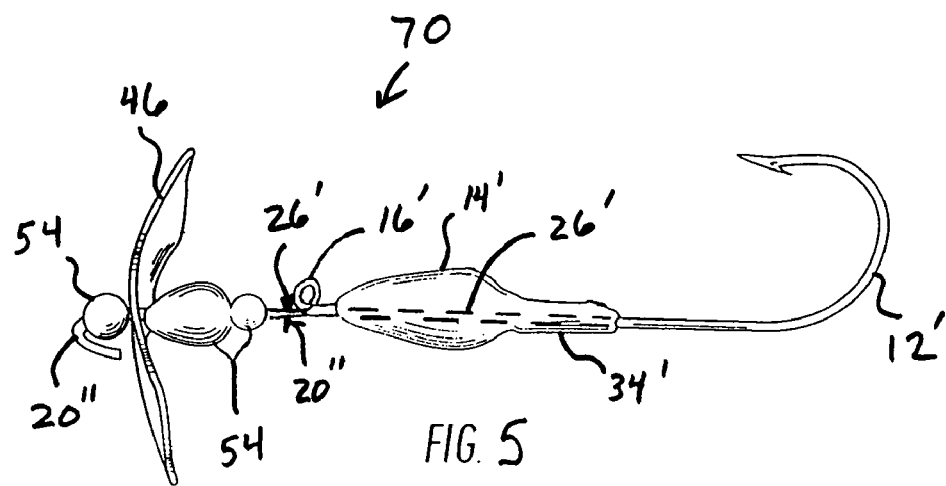
FIG. 5 is a side view of a jig lure in accordance with a yet further embodiment of the invention incorporating a straight-shanked hook.

FIG. 5 shows yet another embodiment of a jig lure 70. The lure 70 is substantially similar to the lure 10 described previously, except that it is made using a hook 12 that does not have an eye disposed at a right angle to the shank of the hook. Rather, the hook 12' has a shank 26' that is substantially linear and extends out of the front of body 14'.

The portion of the shank 26' that extends out of the front of the body 14' is preferably encircled about itself to form a loop 72, and thereafter returns to the linear orientation. The loop 72 provides attachment member 16' to which fishing is attached. The portion of the shank 26' located forward of the loop 72 serves as movable member support 20' in the manner of the movable member support 20. It is preferred that a sufficient number of the beads 54 be used to space the propeller 46 sufficiently remote from the attachment member 16' so as to inhibit interference between the propeller 46 and the fishing line attached to the member 16'. This orientation is preferred when fishing live bait such as salamanders or crawfish, so as to position the attachment member 16' farther from the bait. The body 14' is shown having a collar 34' which does not include the barb 40. This is preferred when utilizing live bait with the lure 70.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. A jig-type fishing lure comprising an elongate, substantially rigid jig body with an elongate hook shank extending along an axis from adjacent a rear portion of the body to a hook bend which terminates at a pointed hook end and a spinner-type fish attractant rotatably mounted on an elongate support extending forwardly from adjacent a front end of the jig body, wherein the hook shank and the support are generally axially aligned; the fishing lure further comprising a single fishing line attachment eyelet projecting from the lure for attachment of a fishing line to the lure via the attachment eyelet at a location generally between the fish attractant and the pointed end of the hook and a first oblong bead disposed on the elongate support forward of the jig body, the spinner-type fish attractant disposed forwardly adjacent the first bead on the elongate support member, a second circular bead disposed forwardly adjacent the spinner-type fish attractant on the elongate support member, so as to maintain said spinner-type fish attractant generally between said first and second beads and generally forwardly of the eyelet, and further wherein said elongate support member has a front end and a rear end, said front end of said elongate support member having a first portion extending forward of the second bead and a second portion extending from said first portion below the second bead, the second portion of said elongate support member forming a free end extending towards said spinner-type fish attractant and disposed adjacent to and separate from said spinner-type fish attractant.

2. The lure of claim 1, wherein the spinner-type fish attractant comprises a propeller.

3. The lure of claim 1, wherein the spinner-type fish attractant comprises a spinner blade.

4. The lure of claim 1, wherein at least a portion of the shank of the hook projects from the lure body generally along a hook axis and wherein the hook comprises a unitary member including the eyelet adjacent an end thereof opposite the pointed end and wherein at least a portion of the body of the hook is embedded within the jig body so that the eyelet extends out of and generally laterally away from the jig body relative to the hook axis to provide the fishing line attachment member generally on a side of the lure body in relation to the axis of the shank of the hook.

5. The lure of claim 1, wherein the spinner-type attractant is mounted on a wire.

6. The lure of claim 1, further comprising a fishing line directly connected to and extending from the line attachment eyelet, wherein when the fishing line is used to pull the jig body through water, the front end of the jig body maintains a longitudinally spaced apart relationship with the rear end of the jig body.

7. A fishing lure, comprising:
an elongate lure body having a front end and a rear end, wherein the lure body is substantially rigid along its length from the front end to the rear end;
a hook having a bend adjacent a pointed end and an elongate shank extending from the bend generally away from the pointed end, at least a portion of the shank being relatively straight and extending along an axis into the rear end of the lure body so that at least a portion of the shank of the hook to which the bend is attached projects rearwardly from adjacent the rear end of the lure body;
an elongate support member fixedly attached to and projecting generally forwardly from the front end of the lure body and generally away from the rear end of the lure body and the hook, wherein the support member is devoid of any line attachment eyelet;
a movable member rotatably mounted on the support member such that at least a portion of the movable member spins about the support member when the lure moves through water in a manner so as to attract fish to the lure; and a line attachment member attached to and extending from the lure body for securement of a fishing line to the lure, the line attachment member being disposed so as to provide a point of attachment of the fishing line to the lure that is located generally between the front end of the lure body from which the support member projects and the rear end of the lure body from which the hook projects;

an oblong bead disposed on the elongate support member forward of the lure body, the movable member disposed forward of the oblong bead on the elongate support member, a circular bead disposed forward of the movable member on the elongate support member, said movable member selected from the group consisting of: a propeller and a spinner blade, said elongate support member having a front end and a rear end, said front end of said elongate support member having a first portion extending forward of the circular bead and a second portion extending from said first portion below the circular bead, the second portion of said elongate support member forming a free end extending towards said movable member and disposed adjacent to and separate from said movable member; and a fishing line directly connected to and extending from the line attachment member;

wherein when the fishing line is used to pull the lure body through water, the front end of the lure body maintains a longitudinally spaced apart relationship with the rear end of the lure body.

8. The lure of claim 7, wherein the hook further includes an eye that extends outside of and away from the lure body to provide the line attachment member.

9. The lure of claim 7, wherein the lure body is a weighted body.

10. The lure of claim 7, wherein the support member consists essentially of a wire having an end fixedly attached to and extending forwardly from the front end of the lure body and on which the moveable member is rotatably mounted.

11. A fishing lure, comprising:

an elongate lure body having a front end and a rear end, the lure body comprising a substantially rigid weighted portion;

a hook attached to the lure body and projecting from the rear end of the lure body, the hook having a bend adjacent a pointed end and an elongate shank extending along an axis toward the front end of the lure body;

an elongate support member generally axially aligned with the elongate shank and attached to and extending forwardly from the front end of the lure body generally away from the rear end of the lure and the hook, wherein the support member is devoid of any line attachment eyelet;

a movable member rotatably mounted on the support member such that at least a portion of the movable member spins around the support member axis when the lure moves through water in a manner so as to attract fish to the lure;

a line attachment member attached to the weighted portion of the lure body for securement of a fishing line to the lure body, the line attachment member being disposed so as to provide a point of attachment of the line that is located generally medially on the weighted portion of the lure body generally between the rear end of the lure and the movable member;

a first bead disposed on the elongate support member forward of the lure body, the movable member disposed forward of the first bead on the elongate support member, a second bead disposed forward of the movable member on the elongate support member, said movable member selected from the group consisting of: a propeller and a spinner blade, said elongate support member having a front end and a rear end, said front end of said elongate support member having a first portion extending forward of the second bead and a second portion extending from said first portion below the second bead, the second portion of said elongate support member forming a free end extending towards said movable member and disposed adjacent to and separate from said movable member; and a fishing line directly connected to and extending from the line attachment member;

wherein when the fishing line is used to pull the lure body through water, the front end of the lure body maintains a longitudinally spaced apart relationship with the rear end of the lure body.

* * * * *